United States Patent [19]

Saito et al.

[11] Patent Number: 4,985,483

[45] Date of Patent: Jan. 15, 1991

[54] FLUORORUBBER COMPOSITION CONTAINING DISPERSED PARTICLES OF CURED SILICONE MATERIAL

[75] Inventors: Masayuki Saito, Gunma; Keiji Yoshida; Mitsuo Hamada, both of Chiba, all of Japan

[73] Assignee: Toray Silicone Company Ltd., Tokyo, Japan

[21] Appl. No.: 411,136

[22] Filed: Sep. 22, 1989

Related U.S. Application Data

[63] Continuation-in-part of Ser. No. 313,123, Feb. 21, 1989, abandoned.

[30] Foreign Application Priority Data

Oct. 17, 1988 [JP] Japan .................................. 63-260925

[51] Int. Cl.$^5$ ............................................... C08K 5/24
[52] U.S. Cl. ..................................... 524/265; 524/263; 525/104; 525/477; 525/479
[58] Field of Search ................ 524/263, 265; 525/104, 525/477, 479

[56] References Cited

U.S. PATENT DOCUMENTS

| | | | |
|---|---|---|---|
| 4,010,136 | 3/1977 | Blizzard et al. | 260/37 SB |
| 4,488,771 | 12/1984 | Koford | 339/278 D |
| 4,859,740 | 8/1989 | Damrath et al. | 525/104 |
| 4,946,883 | 8/1990 | Kunimatsu et al. | 524/265 |

FOREIGN PATENT DOCUMENTS

60-105557  6/1985  Japan .
60-112431  6/1985  Japan .

OTHER PUBLICATIONS

Abstract of J60105527, 1985, Japan.

*Primary Examiner*—Melvyn I. Marquis
*Attorney, Agent, or Firm*—Robert Spector

[57] ABSTRACT

Curable fluororubber compositions exhibit excellent processability on roll mills and can be molded without sticking to or staining the mold surfaces when the composition contains from 0.1 to 30 weight parts per 100 weight parts of fluororubber of a finely divided cured silicone material in the form of a rubber, gel or resin. An epoxy-substituted alkoxysilane or a partial hydrolysis product thereof is present as an ingredient of the curable composition when it is desired to cohesively bond the cured fluororubber to a metal or plastic substrate.

8 Claims, No Drawings

FLUORORUBBER COMPOSITION CONTAINING DISPERSED PARTICLES OF CURED SILICONE MATERIAL

REFERENCE TO COPENDING APPLICATIONS

This application is a continuation-in-part of copending U.S. application Ser. No. 313,123 filed on Feb. 21, 1989 now abandoned.

BACKGROUND OF THE INVENTION

1. Field of the Invention

The present invention relates to a fluororubber composition, and, more specifically, relates to a fluororubber composition which is highly suitable for blending or processing on a roll mill and which is readily released from molds during a molding operation. With the optional addition of a specified silane the composition develops excellent adhesion to a variety of substrates during curing.

2. Description of the Prior Art

Organic fluorine containing rubbers, also referred to as fluororubbers, are used in a broad range of industrial applications due to their excellent mechanical properties. A shortcoming of these rubbers is the difficulty of fabricating them on roll mills and achieving a good release of the cured fluororubber from molds. In addition, the molds have a definite tendency to become soiled during molding operations, which together with the poor release properties results in a high reject rate.

The use of finely divided fluororubber particles as modifiers for a polyorganosiloxane elastomer is disclosed in Japanese unexamined published application no. 60/105,557, which issued on June 11, 1985. Japanese unexamined published application No. 60/112,431, which was published on June 18, 1985, teaches using these modified fluororubber compositions as the material for preparing thermal fixing rolls for electrostatic copying machines.

U.S. Pat. No. 4,488,771, which issued on Dec. 18, 1984, describes molding compositions comprising a matrix of a fluorosilicone elastomer and a crosslinking agent containing dispersed particles of a solid fluorocarbon telomer.

U.S. Pat. No. 4,010,136, which issued on Mar. 1, 1977 discloses polyorganosiloxane elastomer compositions containing a silica filler an organic peroxide and powdered polytetrafluoroethylene as a dispersed phase.

In all of the aforementioned prior art the continuous phase is a polyorganosiloxane and the dispersed phase is a fluorocarbon polymer.

The present invention was the result of extensive investigations directed at solving the aforementioned problems with fluororubbers.

The object of the present invention is to provide a curable fluororubber composition which is excellent with respect to (1) its ability to be fabricated on roll mills and the low reject rate of articles molded from these compositions, and (2) the excellent adhesion developed during curing between the rubber and a variety of substrates.

The present invention also provides a method for improving the processability of curable fluororubber compositions, specifically the ability of these compositions to be molded and fabricated using roll mills typically used for other types of rubber compositions. This invention also provides additives for improving the adhesion of the cured fluororubber compositions to metal and plastic substrates.

SUMMARY OF THE INVENTION

The objective of the present invention is achieved by incorporating into a fluororubber from 0.1 to 30 weight parts per 100 weight parts of fluororubber of a finely divided particulate silicone material.

DETAILED DESCRIPTION OF THE INVENTION

This invention provides an improved fluororubber composition comprising 100 parts by weight of a fluororubber and an amount of curing agent sufficient to cure said fluororubber, where the improvement comprises the presence in said composition of from 0.1 to 30 parts by weight of a finely divided cured silicone material in the form of a rubber, gel or resin, where said silicone material exhibits an average particle diameter not exceeding 100 micrometers.

If it is desired to achieve adhesion between the cured fluororubber and a metal or plastic substrate the curable composition also contains from 0.1 to 30 parts by weight of an alkoxysilane containing an epoxy group as a substituent.

The present invention also provides a method for improving the processability of a curable composition comprising 100 parts by weight of a fluororubber and an amount of curing agent sufficient to cure said fluororubber, said method comprising combining said composition with from 0.1 to 30 weight parts of a finely divided cured silicone material in the form of a rubber, gel or resin, where said silicone material exhibits an average particle diameter not exceeding 100 micrometers.

Cohesive bonding of the cured composition to various substrates, including metals and plastics, can be achieved by including in the curable composition from 0.1 to 30 parts of an alkoxysilane containing an epoxy group as a substituent or a partial hydrolysis product of such a silane.

The Fluororubber Ingredient

To explain the present invention in greater detail, the fluororubber compositions of this invention contain a curable fluorine-containing organic or fluorine-containing organosiloxane polymer as its main ingredient. The cured polymer is a rubbery elastomer. Such fluororubbers are described, for example, in the "Compendium of Synthetic Rubber Processing Technology. Fluororubber/Silicone Rubber." [in Japanese] (Yuzuru Komeya, et al., authors' published by Kabushiki Kaisha Taiseisha).

Examples of suitable fluororubbers include but are not limited to (1) vinylidene fluoride-based polymers such as chlorotrifluoroethylene/vinylidene fluoride copolymers, pentafluoropropane/vinylidene fluoride copolymers, and hexafluoropropene/vinylidene fluoride copolymers: and (2) fluorosilicone rubbers containing a fluoroalkyl group-containing organopolysiloxane as the main ingredient.

The Curing Agent

The compositions of this invention typically include at least one of the conventional curing or vulcanizing agents for the fluororubber ingredient. Typical curing agents for the vinylidene fluoride-type of fluororubbers include but are not limited to polyfunctional amines such as hexamethylenediamine carbamate and organoperoxides such as benzoyl peroxide and dicumyl peroxide. Curing agents for fluorosilicone rubbers include but are not limited to organoperoxides such as 2,4-dichlorobenzoyl peroxide, dicumyl peroxide and 2,5-dimethyl-2,5-di(t-butylperoxy)hexane.

The Cured Silicone Material

The cured particulate silicone material of the present invention consists essentially of particles or granules having average diameter not in excess of 100 micrometers. The mechanical strength of the fluororubber composition of the present invention substantially declines when this average diameter of the particles exceeds 100 micrometers.

The concentration of particulate cured silicone material in the present compositions is from 0.1 to 30 weight parts, preferably from 0.1 to 15 weight parts, and most preferably from 0.1 to 5 weight parts per 100 weight parts of the fluororubber ingredient. The ability of the particulate silicone material to function as a mold release agent is not apparent at concentrations below about 0.1 weight part, while the mechanical strength of the cured fluororubber can be adversely affected when the concentration of particulate silicone material exceeds about 30 weight parts.

The cured particulate silicone material can be a rubber, gel, or resin. The silicone material, which typically includes at least one organopolysiloxane, has been cured by an addition, condensation or free radical reaction.

Addition reaction-cured silicone materials are typically obtained by curing a composition comprising an organopolysiloxane having at least two silicon-bonded alkenyl groups per molecule, an organohydrogenpolysiloxane having two or more silicon-bonded hydrogen atoms per molecule, and a platinum-containing catalyst.

Organoperoxide-cured silicone materials are typically obtained heating an organopolysiloxane in the presence of an organoperoxide.

Condensation reaction-cured silicone materials are typically obtained by the curing a composition comprising a curing catalyst, an organopolysiloxane containing at least two silanol groups per molecule and, as the curing agent, an organohydrogenpolysiloxane or a silane containing at least three silicon-bonded hydrolyzable groups, such as alkoxy, per molecule. Curing agents containing hydrolyzable groups typically require the presence of atmospheric moisture to activate them.

It will be understood that the curable silicone rubber composition can include additives, such as reinforcing fillers, to modify the physical properties of the cured material.

A preferred type of particulate silicone material is obtained by curing a silicone rubber composition in which at least a portion of the organic groups bonded to the silicon atoms of the organopolysiloxane are fluorinated propyl radicals. The cured silicone material preferably contains an additive to improve compatibility or miscibility, and thereby improve the adhesion between the particulate silicone material and the fluororubber. Examples of suitable additives of this type include but are not limited to fluoropropyl group-containing organoalkoxysilanes such as 3,3,3-trifluoropropyltrimethoxysilane and 3,3,3-trifluoropropylmethyldimethoxysilane; epoxy groupcontaining organoalkoxysilanes such as gamma-glycidoxypropyltrimethoxysilane, and gamma-glycidoxypropylmethyldimethoxysilane, partial hydrolysis condensates of any of these silanes, and epoxy group-containing organic compounds such as glycidyl methacrylate and vinylcyclohexene monoxide.

One method for preparing the particulate cured silicone material is described in U.S. Pat. No. 4,742,142, which issued on May 3, 1988. In accordance with the teaching in this patent a curable silicone rubber is blended with water and a surfactant in a colloid mill or homogenizer to prepare a dispersion of the silicone rubber composition. The silicone rubber composition is then cured in particulate form by dispersing the aqueous dispersion in water heated to a temperature of at least 50 degrees Centigrade.

The Optional Epoxy-Substituted Alkoxysilane

An epoxy-substituted alkoxysilane or a partial hydrolysis product of such a silane is present in the curable compositions of this invention when it is desired to adhere the cured fluororubber to a plastic or metallic substrate. These silanes include but are not limited to gamma-glycidoxypropyltrimethoxysilane, gamma-glycidoxypropyltriethoxysilane, gamma-glycidoxypropylmethyldimethoxysilane, and beta-(3,4-epoxycyclohexyl)ethyltrimethoxysilane The concentration of the epoxy-substituted silane is typically from 0.01 to 30 parts by weight per 100 parts of fluororubber. This range is preferably from 0.01 to 15 parts, most preferably from 0.01 to 2 parts.

Preparation of the Present Curable Compositions

One method for preparing the fluororubber composition of this invention comprises mixing the fluororubber, particulate cured silicone material, optional additive and curing agent for the fluororubber to homogeneity using a two-roll mill.

The uncured fluororubber compositions of this invention excel with respect to their ability to be processed on roll mills typically used for rubber compositions. Cured articles that have been molded using these compositions are readily released from molds without staining the mold surfaces, resulting a low reject rate for the finished articles.

Compositions containing the optional epoxy-substituted alkoxysilane develop excellent bonding to both metal and plastic substrates during curing.

The following examples are intended to describe preferred embodiments of the present compositions and method and should therefore not be interpreted as limiting the scope of the invention as defined in the accompanying claims. Unless otherwise specified all parts and percentages specified in the examples are by weight and viscosities were measured at 25 degrees C. The molding properties of the fluororubber compositions were tested by the following method.

Determination of Molding Properties and Molding Reject Rate

The fluororubber composition to be evaluated was placed in a chromium-plated mold used to form key pads for electronic calculators. The dimensions of the mold were 10×10×0.5 cm. The composition was cured at 170 degrees Centigrade for 10 minutes. This molding process was repeated 100 times, and the mold-releasability was evaluated by visually examining the surfaces of the resultant key pads. In addition the percentage of moldings with rough and/or damaged surfaces was determined and is reported as the molding reject rate in the examples. It was observed that rough and/or damaged surfaces on the key pad were caused mainly by poor mold release and/or soiling of the mold surfaces.

EXAMPLE 1

An addition reaction-curing silicone rubber composition was prepared from 100 parts of a dimethylvinylsiloxy-terminated dimethylpolysiloxane having a viscosity of 2,000 centistokes ($2 \times 10^{-3}$ m$^2$/second) and a vinyl content of 0.25%, 1.5 parts of a trimethylsiloxy-terminated methylhydrogenpolysiloxane having a viscosity of 10 centistokes ($1 \times 10^{-5}$ m$^2$/second) and a siliconbonded hydrogen atom content of 0.9% and 0.15 parts of 3% isopropanolic chloroplatinic acid solution. 5 Parts of a nonionic surfactant available as Tergitol TMN-6 from Union Carbide Corporation and 200 parts water were then added and mixed into this silicone rubber composition.

The resultant aqueous dispersion of a curable silicone rubber composition was cured by introducing the dispersion into 5000 parts of water maintained at a temperature of 70° C. The cured silicone rubber was then isolated and dried by heating to yield a particulate silicone rubber with an average particle diameter of 10 micrometers.

A curable fluororubber composition of this invention was obtained by kneading the following ingredients to homogeneity on a two roll mill: 4 parts of the particulate silicone rubber prepared as described in the preceding paragraph 100 parts of a vinylidene fluoride type fluororubber (Viton ® E430 from E.I. DuPont Company), 3 parts calcium hydroxide, 6 parts magnesium oxide, 25 parts carbon black, and 2 parts dicumyl peroxide. This fluororubber composition did not substantially adhere to the surface of the mill rolls, and was judged to have a good rollworkability.

The reject rate for the molded articles was 11%, and the mold-releasability in this test was excellent.

For comparison, a fluororubber composition was prepared as described in the preceding portion of this example, with the exception that the cured particulate silicone rubber was not added. This fluororubber composition readily adhered to the surface of the mill rolls, and was therefore considered to have poor roll-workability. The reject rate for molded articles prepared from this composition was 21%.

EXAMPLE 2

A condensation reaction-curing silicone rubber composition was prepared from 100 parts of a dimethylhydroxysiloxyterminated dimethylpolysiloxane having a viscosity of 100 centistokes ($1 \times 10^{-4}$ m$^2$/second), 10 parts of the methylhydrogenpolysiloxane described in Example 1, 10 parts gamma-glycidoxypropyltrimethoxysilane to improve the compatibility of the silicone rubber with the fluororubber, and 1 part of stannous octoate as the curing catalyst. The composition was cured as described in Example 1 to yield particles of cured silicone rubber exhibiting an average diameter of 12 micrometers.

The following ingredients were kneaded on a two-roll mill to produce a curable fluororubber composition of this invention: 5 parts silicone rubber powder obtained as described in the first section of this example 100 parts of a vinylidene fluoride-type fluororubber (Dai-el G901 from Daikin Kogyo Co. Limited), 2 parts dicumyl peroxide, 4 parts triallyl isocyanurate, and 20 parts carbon black. This fluororubber composition had an excellent roll-workability during blending. When the composition was molded, the cured articles released easily from the mold and the reject rate was 8%.

EXAMPLE 3

A fluororubber composition of this invention was prepared by blending the following ingredients to homogeneity on a two roll mill: 5 parts of a cured particulate silicone rubber prepared as described in Example 2, 100 parts of a fluorosilicone rubber (LS63u from Toray Silicone Company Ltd.), and 1 part of 2,5-dimethyl-2,5-di(t-butylperoxy)hexane. The curable composition could be processed on a roll mill without difficulty. Cured articles molded using this composition did not stick to or stain the mold surfaces.

EXAMPLE 4

A finely divided addition reaction-curing fluorosilicone rubber of this invention was prepared from 100 parts dimethylvinylsiloxy-terminated trifluoropropylmethylsiloxanedimethylsiloxane copolymer having a vinyl group content of 0.15% and containing 60 mole% of trifluoropropylmethylsiloxane units and 40 mole% dimethylsiloxane units: 1 part of the methylhydrogenpolysiloxane described in Example 1. and 0.15 part of a 3% isopropanolic chloroplatinic acid solution. The resultant fluorosilicone rubber composition was cured as described for the finely divided material of Example 1 to yield a powder consisting essentially of spherical particles with average diameters of 10 micrometers.

A curable fluororubber composition was prepared using the procedure of Example 2, with the modification that the fluorosilicone rubber powder prepared as described in the preceding section of the present example was used in place of the silicone rubber powder described in Example 2. The resultant composition exhibited a good ability to be blended on the roll mill. The reject rate for the articles molded from this composition was 5%.

EXAMPLE 5

A silicone rubber powder was prepared using the procedure described in Example 2, with the modification that trifluoropropyltrimethoxysilane was used in place of the gamma-glycidoxypropyltrimethoxysilane used in Example 2.

A curable fluororubber composition was then prepared using the procedure of Example 2, with the modification that the silicone rubber powder obtained as described in the preceding paragraph of the present example above was used in place of the silicone rubber powder described in Example 2. Evaluation of this composition demonstrated its excellent roll-workability, molding properties, and a molding reject rate of 3%.

Example 6

A silicone rubber powder was prepared according to the procedure of Example 1, but without the surfactant described in Example 1. The cured silicone rubber consisted of particles with an average diameter of 20 micrometers.

A fluororubber composition was prepared according to the procedure in Example 1 with the modification that the silicone rubber powder described in the first paragraph of the present example was used in place of the silicone rubber powder of Example 1. The composition exhibited excellent workability on the roll mill and releasability from the mold.

EXAMPLE 7

This example and the following Example 8 demonstrate the use of an optional epoxy-substituted alkoxysilane to improve the adhesion of the present fluororubber compositions to metal and polyester substrates.

An addition-curing silicone rubber composition was prepared from 100 parts dimethylvinysiloxy-terminated dimethylpolysiloxane exhibiting a viscosity of 2 Pa.s and a vinyl content of 0.25 percent, 1.5 parts trimethylsiloxy-terminated methylhydrogenpolysiloxane (viscosity=10 centistokes, siliconbonded hydrogen content=0.9%). and 0.15 parts 3% isopropanolic chloroplatinic acid solution. 5 Parts surfactant (Tergitol TTMA6. nonionic surfactant from Union Carbide Corp. and 200 parts water were mixed into this silicone rubber composition, and this mixture was then poured into 5,000 parts hot water (70° C.); in order to cure said silicone rubber composition. The resultant cured material was removed and dried in a hot sir flow to yield a silicone rubber particulate with an average diameter of 10 micrometers.

A fluororubber composition was then obtained by mixing the following on a two-roll mill: 4 parts of the silicone rubber particulate obtained as above, 100 parts vinylidene fluoride-based fluororubber available as Viton E 430 from DuPont 3 parts calcium hydroxide, 6 parts magnesium oxide, and 2 parts gamaglycidoxypropyltrimethoxysilane. The fluororubber composition did not stick to the surface of the two-roll mill during this mixing process, and its roll workability was thus excellent. It could be mixed to homogeneity by kneading for 12 minutes.

This fluororubber composition was applied on a stainless steel (Type SUS 304) test plate and a polyester resin test plate, and the fluororubber composition was cured by heating for 10 minutes at 170° C. under a pressure of 25 kg/cm$^2$. The cured fluororubber was bonded to both the stainless steel and polyester substrates to from a single unit. The fluororubber on each test specimen was then peeled by pulling an end at an angle of 90° relative to the plane of the test specimen. Failure occurred entirely in the rubber layer in both test specimens, which was rated as 100% cohesive failure.

For purposes of comparison, a fluororubber composition was prepared as described in the first section of this example, with the exception that the particulate silicone rubber was omitted. This composition stuck to the surface of the mill roll and its workability wa therefore rated as poor. A kneading time of 30 minutes was required to obtain a homogeneously mixed fluororubber composition. A second comparative fluororubber composition was prepared using the particulate silicone rubber described in the first part of this example, but omitting the gammaglycidoxypropyltrimethoxysilane. When this composition was cured in contact with a stainless steel or a polyester substrate as described in the first section of this example, separation occurred at the interface between the rubber later and the substrate, and was rated as 100 percent interfacial separation.

EXAMPLE 8

A condensation curable silicone rubber composition was prepared using the following ingredients: 100 parts of a dimethylhydroxysiloxy-terminated dimethylpolysiloxane exhibiting a viscosity of 0.1 Pa.s, 10 parts of the methylhydrogenpolysiloxane described in Example 1 and 1 part of stannous octoate. This composition was converted to a particulate silicone rubber (A) as described in Example 7.

The following ingredients were blended to homogeneity using a two-roll mill: 5 parts of the particulate silicone rubber A, 100 parts of a vinylidene fluoride-based fluororubber available as Dai-el G901 from Daikin Kogyo Company, Limited, 5 parts of triallyl isocyanurate, and 20 parts of carbon black. The workability of the resultant fluororubber composition was excellent. When the adhesion of this composition was evaluated as described in Example 7, 100 cohesive failure was achieved using both the stainless steel and polyester substrates.

That which is claimed is:

1. In a fluororubber composition comprising (A) 100 weight parts of a curable fluororubber and (B) a quantity of a curing agent sufficient to cure the fluororubber, the improvement comprising the presence of
   (C) from 0.1 to 30 weight parts of a finely divided cured silicone material in the form of a rubber, gel or resin, where said silicone material exhibits an average particle diameter not exceeding 100 micrometers.

2. A composition according to claim 1 wherein the cured silicone material is an organopolysiloxane rubber that has been cured by an addition, free radical or condensation reaction and the concentration of said material is from 0.1 to 15 weight parts.

3. A composition according to claim 2 where said cured organosilicone material includes an additive to further improve the processability of said composition said additive being selected from the group consisting of epoxy group-containing organoalkoxysilanes, partial hydrolysis condensates thereof, fluoropropyl group-containing organoalkoxysilanes and partial hydrolysis condensates thereof.

4. A composition according to claim 2 where said composition further includes an additive to achieve cohesive bonding between said composition in the cured form and a metal or plastic substrate, said additive being selected from the group consisting of epoxy group containing alkoxysilanes and their partial hydrolysis products.

5. A composition according to claim 2 in which the cured silicone material is prepared by curing a fluorosilicone rubber composition comprising a fluoropropyl group-containing organopolysiloxane.

6. A composition according to claim 1 where said finely divided silicone material is prepared by blending a curable silicone rubber with water and a surfactant in a colloid mill or homogenizer to form an aqueous dispersion and then curing the resultant dispersion by blending it with water heated to a temperature of at least 50 degrees Centigrade.

7. A composition according to claim 1 where said fluororubber is a fluorosilicone rubber.

8. A composition according to claim 1 where said fluororubber is an organic fluororubber.

* * * * *